United States Patent [19]
Dides et al.

[11] Patent Number: 5,519,559
[45] Date of Patent: May 21, 1996

[54] ELECTRONIC CONNECTION DEVICE WITH REVERSE POLARITY PROTECTION

[75] Inventors: Christian Dides, Mouans Sartoux; Xavier Leyre, Cannes, both of France

[73] Assignee: Aerospatiale Societe Nationale Industrielle, France

[21] Appl. No.: 498,605

[22] Filed: Jul. 6, 1995

[30] Foreign Application Priority Data

Jul. 11, 1994 [FR] France .................................. 94/08554

[51] Int. Cl.$^6$ .......................................................... H02H 3/18
[52] U.S. Cl. ............................ 361/84; 361/187; 307/127
[58] Field of Search ................................ 361/84, 111, 82, 361/185, 187; 307/127

[56] References Cited

U.S. PATENT DOCUMENTS 3,365,617  7/1968  Flanagan ................................... 361/91

FOREIGN PATENT DOCUMENTS 2333336  11/1976  France .
2028036   8/1979  United Kingdom .

*Primary Examiner*—Todd DeBoer
*Attorney, Agent, or Firm*—Remy J. VanOphem; John VanOphem

[57] ABSTRACT

An electronic device offering protection against connection of a direct current power supply unit with reverse polarity includes a branch disposed between two potential lines and including a reverse biased diode and a first component sensitive to a flow of current. A first switch is disposed on the downstream side of this branch, on one of the potential lines. A control circuit has two terminals receiving a control signal and, connected in series between those terminals, a second switch and a second component sensitive to a flow of current. The first switch, normally open, is closed by the second sensitive element if the latter detects a flow of current. The second switch, normally closed, is opened by the first sensitive component if the latter detects a flow of current.

5 Claims, 1 Drawing Sheet

ELECTRONIC CONNECTION DEVICE WITH REVERSE POLARITY PROTECTION

BACKGROUND OF THE INVENTION

1. Field of the Invention

The invention concerns an electronic circuit for connecting a receiver to a direct current power supply with the receiver protected against connection of the current supply with reversed polarity. A circuit of this kind includes at least one higher potential line and one lower potential line.

2. Description of the Prior Art

There are various methods of protecting against polarity reversal.

A first method consists in disposing a diode in one or both of the higher and lower potential lines so that the diode allows current to flow if the connection is correct but prevents the current from flowing otherwise. This has the drawback of power dissipation in the order of 0.3 to 0.6 times the current flowing; also, the connection is broken in the event of a fault. To avoid this latter drawback it is possible to use a plurality of diodes in parallel (the power dissipation is then increased commensurately, however) and in series (diode square).

A second method consists in disposing a diode in series with a resistor between the potential lines so that the lines are short-circuited if the polarity is reversed. However, this does not totally eliminate the application of reverse polarity to the receiver; there also remains the possibility of destruction by short-circuiting of the unit to be protected (fire hazard) and the supply.

A third method consists in disposing a diode in series with a coil between the potential lines; the diode is forward biased (so that it allows the current to flow when the power supply is connected with the correct polarity) and the coil is part of a relay of which the mobile part (armature) constitutes, on one or both potential lines and on the downstream side of the diode+ coil branch, a normally open switch which closes only upon flow of current in the coil in the direction allowed by the diode, i.e. when the supply is connected correctly. This provides better protection of the receiver than the second method, but has the same drawbacks as the first solution (total loss of the connection function in the event of a fault and high power dissipation, limited only by the resistance of the relay coil).

A fourth type of method uses electromechanical devices, extensively described in the literature, but having the disadvantages of being heavy, bulky, constructed from large mechanical parts and having large airgaps.

Examples of patents in this field are:

U.S. Pat. No. 2,887,626, 19 May 1959: "Reverse Current Relay",

French Patent 819 610, 19 Dec. 1960: "High-Speed Trigger Mechanism",

Swiss Patent 342,624, 15 Jan. 1960: "Electrodynamic System for the Generation of Mechanical Impulses", and British Patent 2914/58, 29 Jan. 1958: "Improvements in or relating to Electric Protective Devices".

An object of the invention is to remedy the above drawbacks and the invention is directed to a connection device adapted to connect a direct current power supply to a receiver which has a reverse polarity protection function, which is simple, light in weight and compact in size, the connection function of which is not interrupted in the event of a single failure of any of its components, in which the power dissipation is as low as possible, and which nevertheless provides efficient protection of the supply and the receiver in the event of connection of the supply with reverse polarity.

SUMMARY OF THE INVENTION

To this end the invention proposes an electronic device for connecting a receiver to a direct current power supply unit with the receiver protected at least against reversed polarity of the supply. The device includes a higher potential line, a lower potential line, a branch disposed between the potential lines and further includes a diode and a first component sensitive to a flow of current. A first switch is disposed on the downstream side of the branch, on one of the potential lines, and a control circuit including two terminals adapted to receive a control signal is provided. A second switch and a second component sensitive to a flow of current are disposed in series between the terminals. The first switch is normally open and is closed by the second sensitive component when the latter detects a flow of current in the control circuit. The second switch is normally closed and is opened by the first sensitive component when the latter detects a flow of current in the branch, the diode of the branch being reverse biased to prevent flow of current from the higher potential line to the lower potential line.

Preferably:

the first switch is mechanically coupled to a third switch disposed on the other of the potential lines on the downstream side of the branch, in such manner as to be closed/opened at the same time as the first switch;

the first switch and the second sensitive component are part of a first relay and the second switch and the first sensitive component are part of a second relay;

the second relay is a monostable relay; and the first relay is a bistable relay.

Objects, features and advantages of the invention emerge from the following description given by way of non-limiting example with reference to the appended drawing.

DESCRIPTION OF THE PREFERRED EMBODIMENT

Figure 1:
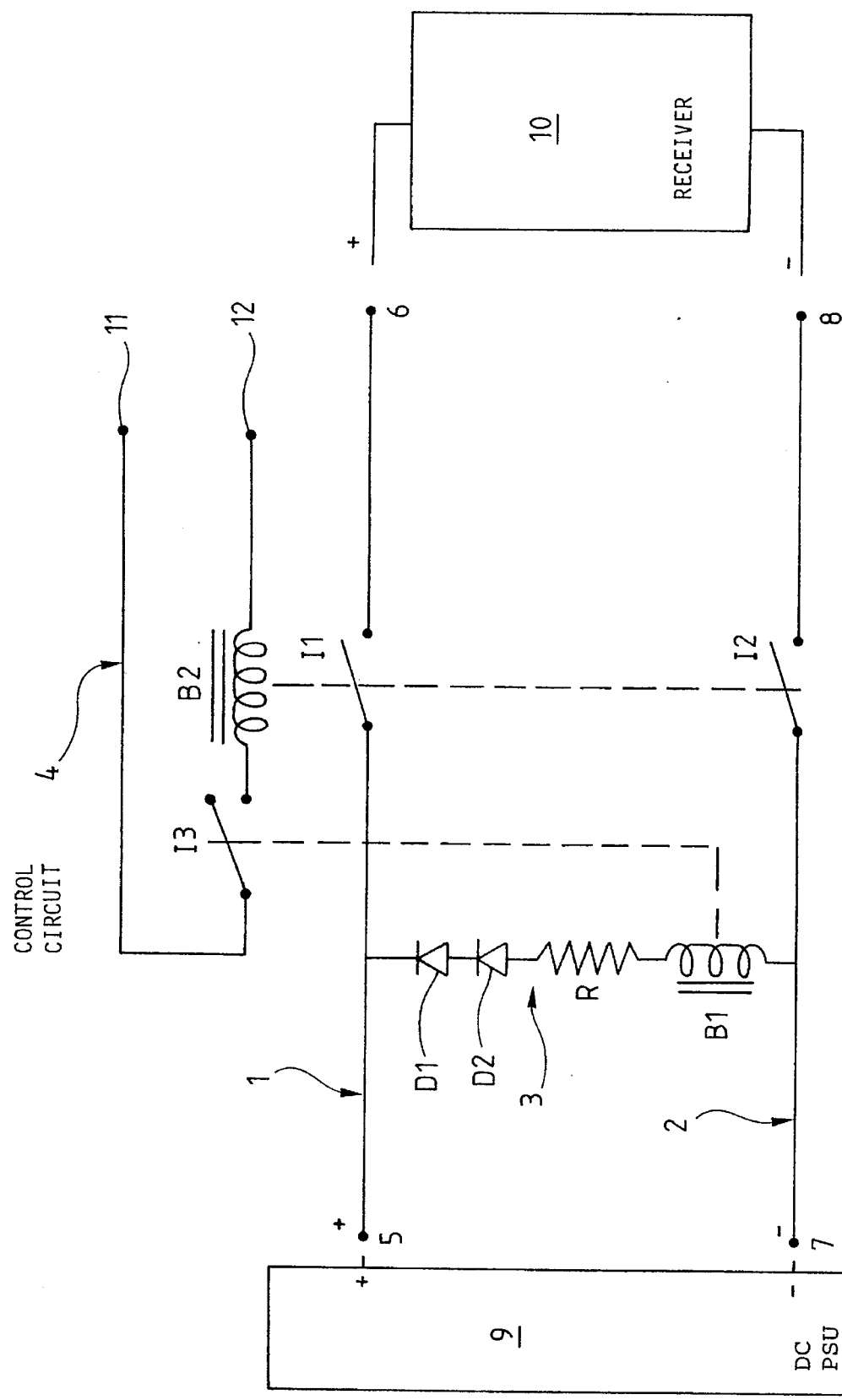
FIG. 1 is a block diagram of a connection and protection device of the invention.

The device includes a higher potential line 1, a lower potential line 2, a branch 3 disposed between the lines, and a control circuit 4.

The higher potential line 1 has an input terminal 5 and an output terminal 6. The lower potential line 2 has an input terminal 7 and an output terminal 8.

The two input terminals 5 and 7 are respectively connected to the "+" and "−" input terminals of a receiver 10 to be protected against polarity reversal.

In the lines are respective switches I1 and I2 (one would suffice) (usually integrated into the same physical device and operated by the same coil).

The branch 3 includes a diode D1, in this example associated with a diode D2 and a component sensitive to a flow of current. In this example this component includes a resistor R and a coil B1.

The control circuit 4 has an input terminal 11 and an output terminal 12 between which are disposed in series a switch I3 and a component sensitive to a flow of current, in this example a coil B2.

The switch I1 and I2 are mechanically coupled so that they are either opened simultaneously or closed simultaneously. They are normally open. They are controlled by the component sensitive to the flow of current included in the circuit 4, i.e. by the coil B2.

The switches I1 and I2 are preferably the mobile parts (armatures) of a relay of which the coil B2 is the coil. This electromagnetic relay is advantageously a bistable relay.

The switch I3 is normally closed. It is operated by the component sensitive to the flow of current included in the branch 3, i.e. by the coil B1.

The switch I3 is preferably the mobile part or armature of a relay of which the coil B1 is the coil. This electromagnetic relay is advantageously a monostable relay.

The positive output voltage V of the power supply is in the order of a few tens of volts (for example 37 V), for example, and the input current of the circuit 1+2 is in the order of a few amperes (for example 6 A) while the value of the resistor R is a few hundred ohms (for example 200 ohms).

It follows from what has been stated above that in the unoperated state the input terminals 5 and 7 are isolated from the output terminals 6 and 8 while the circuit between the terminals 11 and 12 is closed.

The control circuit is adapted to receive a signal only after a time delay starting from connecting the power supply unit 9 (for example a time delay of between a few seconds and a few minutes). One way to guarantee that this condition is met is to authorize the generation of a trigger pulse (by software, for example) only if an appropriate detector senses that the supply is connected.

If the supply has been connected correctly, no current flows in the branch 3 (except for a negligible leakage current of a few microamperes) in which the diodes are reverse biased.

The relay B1+I3 is not energized and the circuit between the input and output terminals 11 and 12 remains closed. When the control signal is applied to the terminals, the current that flows energizes the coil B2 which closes the higher and lower potential lines 1 and 2. If, as mentioned above, the latter relay is a bistable relay, the higher and lower potential lines 1 and 2 remain closed even after the control signal terminates, until a further control signal commands opening of the switches I1 and I2. As an alternative to this, the control signal can remain present throughout the time for which the receiver 10 must be supplied with power, in which case the relay B2+I1+I2 can be a monostable relay. Even in this latter case the power consumption of the control circuit is negligible (a few milliwatts).

However, if the supply is connected with the polarity reversed, then all of the current flows in the branch 3; because of the resistor R, this current is in practice limited to a few milliamperes, sufficient to operate the switch I3 and to open the circuit between the input and output terminals 11 and 12, without this causing excessive power consumption likely to destroy the supply. For as long as this situation continues, application of a control signal between the input and output terminals 11 and 12 has no effect on the coil B2 and therefore on the switches I1 and I2: the receiver remains isolated from the supply and is totally protected.

This situation is terminated only upon disconnection of the supply.

It will be realized that the circuit is highly resistant to a number of faults:

if D1 or D2 or R goes open-circuit, the connection function remains, if D1 or D2 (but not both) is short-circuited, the connection and protection functions remain, if I1 and I2 stick open or shut, the protection function remains, if I1 or I2 sticks open or shut both functions remain, and if I3 sticks open or shut the connection function remains.

The power consumption of the circuit under nominal operating conditions is very low (a few milliwatts).

It goes without saying that the foregoing description has been given by way of non-limiting example only and that many variants can be suggested by the person skilled in the art without departing from the scope of the invention.

There is claimed:

1. Electronic device for connecting a receiver to a direct current power supply unit with said receiver protected at least against reversed polarity of said supply, comprising a higher potential line, a lower potential line, a branch disposed between said potential lines and including a diode and a first component sensitive to a flow of current, a first switch disposed on the downstream side of side of said branch, on one of said potential lines, and a control circuit including two terminals adapted to receive a control signal and, disposed in series between said terminals, a second switch and a second component sensitive to a flow of current, said first switch being normally open and being closed by said second sensitive component when said second sensitive component detects a flow of current in said control circuit and said second switch being normally closed and being opened by said first sensitive component when said first sensitive component detects a flow of current in said branch, said diode of said branch being reverse biased to prevent flow of current from said higher potential line to said lower potential line.

2. Electronic device according to claim 1 wherein said first switch is mechanically coupled to a third switch disposed on the other of said potential lines on the downstream side of said branch, in such manner as to be closed/opened at the same time as said first switch.

3. Electronic device according to claim 1 wherein said first switch and said second sensitive component are part of a first relay and said second switch and said first sensitive component are part of a second relay.

4. Electronic device according to claim 3 wherein said second relay is a monostable relay.

5. Electronic device according to claim 3 wherein said first relay is a bistable relay.

\* \* \* \* \*

UNITED STATES PATENT AND TRADEMARK OFFICE
CERTIFICATE OF CORRECTION

PATENT NO. : 5,519,559
DATED      : May 21, 1996
INVENTOR(S): Dides et al

It is certified that error appears in the above-indentified patent and that said Letters Patent is hereby corrected as shown below:

```
    Column 3, line 5, delete "switch" insert ---- switches
----.

Column 4, line 33, delete "side of side" insert ----
side ----.
```

Signed and Sealed this

Eleventh Day of February, 1997

Attest:

BRUCE LEHMAN

*Attesting Officer*   *Commissioner of Patents and Trademarks*